April 2, 1957  S. J. SMITH  2,787,018
WINDSHIELD WIPER
Filed May 6, 1954
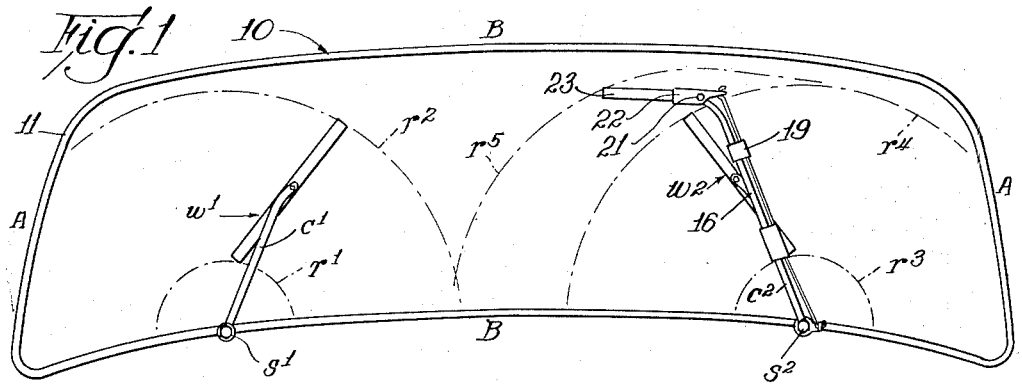
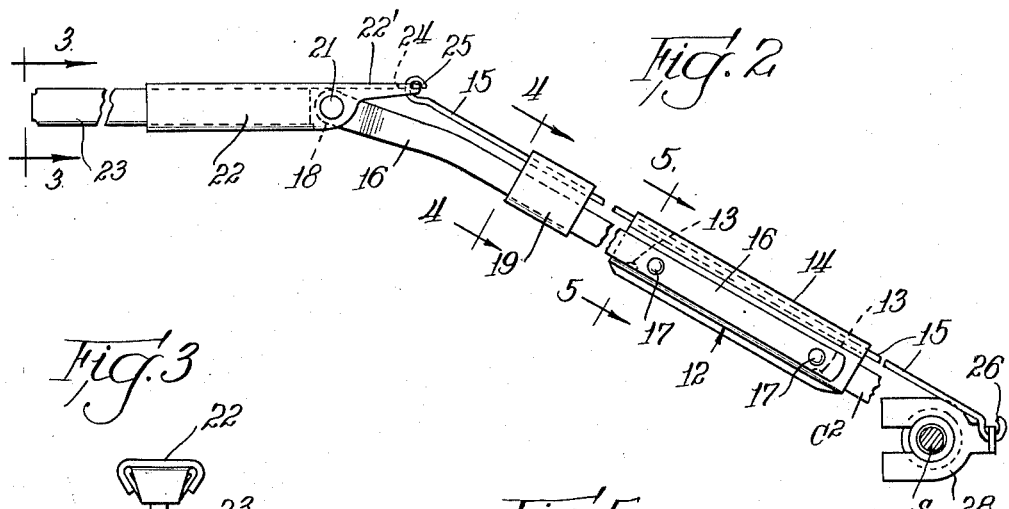
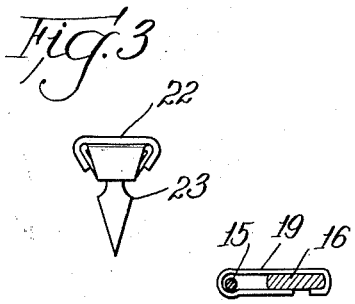
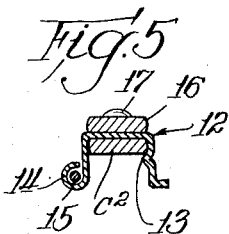
INVENTOR.
Stanley J. Smith
BY
John A. Watson
Atty

United States Patent Office 2,787,018
Patented Apr. 2, 1957

2,787,018

WINDSHIELD WIPER

Stanley J. Smith, Chicago, Ill.

Application May 6, 1954, Serial No. 427,945

5 Claims. (Cl. 15—255)

This invention relates to windshield wiper mechanisms and, more particularly, to a wiper arrangement that may be employed with the ordinary arcuately moving wipers to wipe otherwise inaccessible portions, especially center portions, of automobile and other windshields as where the vertical or up and down surface dimension of that portion of a windshield which is to be cleaned or wiped is less than the transverse dimension thereof.

The primary object of my invention is to provide a simple and relatively inexpensive mechanism of the type and for the purpose above mentioned.

Another important object is to provide a wiper and wiper operating mechanism that may readily be attached to the ordinary arcuately sweeping wiper as an auxiliary wiper means to clear windshield surface areas such as the center areas of the so-called "full-vision" or "wrap-around" windshields, or, that may be embodied as an initial and more or less integral part of arcuately sweeping wipers for the same purpose.

Many other objects as well as the advantages and some of the uses of the invention will be appreciated after reading the following description and claims and after viewing the drawings in which:

Fig. 1 is a view, in front elevation, of a so-called "full-vision" or "wrap-around" windshield for an automobile showing, at the right, the application of and the area that may be swept by a windshield wiper constructed and arranged in accordance with a presently preferred form of the invention, the view also illustrating, at the left, a normal or ordinary wiper and the area it may sweep;

Fig. 2 is a large scale view of certain parts of the wiper mechanism shown at the right in the illustration of Fig. 1, as the same appears in front elevation the main wiper blade and other parts shown in Fig. 1 being omitted in the interest of clarity;

Fig. 3 is a view in end elevation of one type of wiper blade that may be employed, the view looking from the position and in the direction of the arrows of line 3—3 of Fig. 2;

Figs. 4 and 5 are sectional views taken along section lines 4—4 and 5—5, respectively, of Fig. 2, looking in the direction indicated by the arrows; and Fig. 6 is a view, in side elevation of a simple type of bracket on which a part of the wiper operating mechanism of the instant embodiment may be pivotally anchored.

The windshield generally designated 10 in Fig. 1 is of a type having a somewhat trapezoidal shape in front elevational aspect although it may have curvature in a horizontal plane, as with the usual "wrap-around" windshields currently in use, and may also have curvature in a vertical plane if such be desired. The invention is concerned only in an incidental way with the surface contour of the windshield, being primarily concerned with sweeping or clearing such areas of the windshield surface as normally could not be reached by the action of a wiper swinging in an arc of maximum radius about its axis of oscillation.

Where, for instance, as with the windshield illustrated, the lateral or horizontal dimension A—A is so much greater than the vertical dimension B—B, that a pair of wipers, generally designated $W^1$ and $W^2$, each having a radial wiping "reach" extending substantially across the width (height) of the windshield 10 to the upper part of the frame 11 which surrounds the glass cannot reach and clear a center area of such windshield, a dangerous condition may be created. The vision of the driver and of others in an automobile may be obscured or blurred over a substantial angle, especially to the right of the driver over a range of critical importance. The arcuate areas that normally will be cleared or wiped by the usual wipers $W^1$ and $W^2$ are indicated in Fig. 1 between the concentric dash lines $r^1$—$r^2$ and $r^3$—$r^4$, respectively. By employing the invention a substantial part of the central area of the windshield as, for instance, that part between the two arcuate areas stated may be cleaned, in the illustration that area bounded by the dash line $r^4$, the lower part of the frame 11 and the curved dash line $r^5$.

Each of the wipers $W^1$ and $W^2$ is supported and swung through its path of travel by means of a carrier arm $C^1$ and $C^2$, respectively, in turn secured to oscillatable shafts the outer ends of which may be considered as represented in Fig. 1 by the hexagon cap-nuts $S^1$ and $S^2$, respectively. The oscillatable shafts have their axes disposed substantially normal to the windshield surface and are to be oscillated by any suitable motive power after the usual practices. In the illustrated embodiment the arrangement is such that it is preferred to have the two wipers $W^1$ and $W^2$ swing together or simultaneously first toward one another and the center of the windshield and then, reversing, swing away from one another and from the center of the windshield toward the opposite side edges thereof. Where the wiper of the invention is employed at each side of the windshield to sweep an area outward of the area between $r^1$ and $r^2$ that corresponds to the area of partial crescent shape between $r^4$ and $r^5$, it may be preferable to have the two wipers swing simultaneously, first both clockwise and then both counterclockwise to avoid interference as will more clearly appear as the description proceeds.

Removably clamped to and along a length of carrier arm $C^2$ is a spring clip 12 of channel or U-shape in cross-section. Projecting inwardly at spaced places along one side of the clip channel are projections 13 by which, plus the spring or resilience of the material of the clip, the clip is retained on the carrier arm $C^2$. The opposite side of the clip channel may be formed to provide a tube or sleeve 14 to receive and guide a rod or stiff wire 15 as the same slides (reciprocates) back and forth therethrough for a purpose to be described. A rigid wiper carrier arm or bar 16 similar to carrier arm $C^2$ is rigidly secured to the clip 12 as by rivets 17 and extends radially outward to a terminus 18 adjacent to the outer reach of the wiper $W^2$ as will be observed in Fig. 1. If necessary, a second guide clip 19 for guiding the rod 15 may be secured to the carrier arm 16 radially outward of the clip 12. Since the carrier arm $C^2$ is secured to the shaft S for oscillation with the shaft as it turns, first one way and then the other, about its axis (perpendicular to the plane of the drawing), the auxiliary or extension arm 12 which is secured to arm $C^2$ will also oscillate about the axis of shaft S.

Pivotally mounted on the outer end 18 of carrier arm 16 on a pivot 21 is a lever bar 22 adapted to carry an auxiliary wiper blade 23. As a convenience the bar 22 may be constructed as indicated in Fig. 3 to permit removal and replacement of the blades. The pivot axis of the pivot 21 usually will be substantially parallel to the axis of shaft S but may vary therefrom to accommodate the arrangement to curvature or other characteristics of the windshield. The bar 22 is shown as a lever of the first class and as such has a portion 22' which projects to the opposite side of pivot 21 from the wiper blade 23.

The outer end of bar portion 22' has an "eye" or opening 24 for the reception of the hooked or looped end 25 of the rod 15 which, at its opposite end, has a hook 26 adapted to engage through an opening 27 in a bracket 28. Bracket 28 is of U-shape in plan as shown in Fig. 2 so that it may be slid over the shaft S and firmly secured or anchored in the position there illustrated against movements about the axis of shaft S. The bracket 28, in effect, is a crank and the rod 15 is a pitman so that, as the carrier arm C² is swung or oscillated back and forth about the axis of shaft S, relative movement is imparted to the rod 15 to cause the lever bar 22 to swing about the axis of its pivot 21.

The swing of lever bar 22 is from a position where the bar 22 and wiper 23 are substantially in alignment with the slightly angled outer end of carrier arm 16, when the carrier arm C² and wiper blade W² are at the bottom of the windshield adjacent to its center portion, to a position where the lever bar 22 extends approximately at a right angle to the carrier arms C² and 16 when those arms extend vertically upward across the windshield and substantially at right angles to their horizontal starting positions. During this movement the lever bar 22 remains substantially horizontal so that the resultant area swept or wiped across the face of the windshield is substantially one horn or one-half of a crescent. The area wiped by the main blade W² plus that wiped by the auxiliary blade 23 may be sufficient under ordinary circumstances to give the driver of the vehicle substantially greater vision than could possibly be available by utilizing the usual wiper W² and in many circumstances only one auxiliary wiper need be utilized. On the other hand, if for any reason it is desirable to clear a corresponding area of the windshield adjacent to the arcuate area wiped by wiper W¹, it is only necessary to apply another auxiliary wiper to the carrier arm C¹ and to arrange the movement of the two wiper mechanisms so that both move together in the same rotary direction, i. e., clockwise and then counter-clockwise.

The invention is susceptible of other embodiments and many variations as will be appreciated. Consequently, I desire to be limited only by the invention spirit and the scope of the appended claims.

I claim:

1. An auxiliary windshield wiper mechanism for attachment to a primary wiper mechanism carrier arm mounted for oscillation about a relatively fixed axis and comprising, wiper blade carrier means adapted to be detachably secured to said carrier arm, an auxiliary wiper blade pivotally mounted upon said carrier means for swinging movements about an axis substantially parallel to said fixed axis and in spaced relation thereto, a bracket adapted to be secured adjacent and in substantially fixed relation relative to said fixed axis, a link pivotally connected at one end to said carrier means in spaced relation to the axis of pivotal mounting of the auxiliary blade and pivotally connected at its other end to said bracket on a pivot axis spaced from said fixed axis, and means for maintaining a substantially fixed spacing between said link and said carrier arm at all times.

2. In a mechanism of the character described, a wiper blade, a wiper blade carrier means for supporting and swinging said wiper blade in an arcuate path about a substantially fixed axis, a second wiper blade carrier pivotally associated with said carrier means on a pivot axis disposed radially outward of the said fixed axis, a second wiper blade carried by the second carrier, and means including a link pivotally connected at one end to said second carrier and at its other end to a fixed abutment adjacent to said fixed axis and operated by swinging movements of said carrier means for so moving said second blade carrier about its said pivot axis as to cause the second blade to wipe an auxiliary path radially outward of said arcuate path and extending through an angle of substantially 90° about a portion of said arcuate path.

3. In a mechanism of the character described, a wiper blade, a wiper blade carrier means for supporting and swinging said wiper blade in an arcuate path about a substantially fixed axis, a second wiper blade carrier pivotally associated with said carrier means on a pivot axis disposed radially outward of and substantially parallel to the said fixed axis, a second wiper blade carried by the second carrier, and means including a link pivotally associated with the second said carrier and a fixed abutment adjacent to said fixed axis and operated by swinging movements of the first said carrier means for so moving said second carrier about its said pivot axis as to cause the second blade to wipe an auxiliary path radially outward of said arcuate path and extending through an angle of substantially 90° about a portion of said arcuate path, said auxiliary path being of varying width measured radially of said fixed axis.

4. In a wiper mechanism for windshields and the like wherein the surface area to be wiped has one surface dimension greater than the other, wiper means including a blade movable in an arc about a relatively fixed axis for wiping an arcuate area through a predetermined arc about said fixed axis, the radial distance from said fixed axis to the outermost boundary of said arcuate area not exceeding the lesser of said surface area dimensions, auxiliary wiper means associated and movable with the first said wiper means about said relatively fixed axis, said auxiliary wiper means including an auxiliary blade pivoted for swinging movements about an axis substantially parallel to and spaced radially outward from said fixed axis adjacent to the outer radial reach of the first wiper means, and means operative to swing said auxiliary blade over an area radially beyond the area wiped by the first blade in the direction of the said greater dimension and within the limits of the lesser dimension.

5. In a wiper mechanism for windshields and the like wherein the surface area to be wiped has one surface dimension greater than the other, wiper means including a blade movable in an arc about a relatively fixed axis for wiping an arcuate area through a predetermined arc about said fixed axis, the radial distance from said fixed axis to the outermost boundary of said arcuate area not exceeding the lesser of said surface area dimensions, auxiliary wiper means associated and movable with the first said wiper means about said relatively fixed axis, said auxiliary wiper means including an auxiliary blade pivoted for swinging movements about an axis substantially parallel to and spaced radially outward from said fixed axis adjacent to the outer radial reach of the first wiper means, and means operated by the operation of the first said wiper means to swing said auxiliary blade over an area radially beyond the area wiped by the first blade in the direction of the said greater dimension and within the limits of the lesser dimension.

References Cited in the file of this patent

UNITED STATES PATENTS

| | | |
|---|---|---|
| 1,866,700 | Farmer | June 12, 1932 |
| 2,232,757 | Zeder | Feb. 25, 1941 |
| 2,336,007 | Fuller | Dec. 7, 1943 |
| 2,412,319 | Carey | Dec. 10, 1946 |
| 2,644,187 | Lacy | July 7, 1953 |